United States Patent
Kim et al.

(10) Patent No.: US 10,950,894 B2
(45) Date of Patent: Mar. 16, 2021

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Ha Eun Kim, Daejeon (KR); Young Min Lim, Daejeon (KR); Min Jung Kim, Daejeon (KR); Chul Haeng Lee, Daejeon (KR)

(73) Assignee: LG Chem, Ltd.

(*) Notice: Subject to any disclaimer, the term of this patent is extended or adjusted under 35 U.S.C. 154(b) by 15 days.

(21) Appl. No.: 16/308,724

(22) PCT Filed: Jan. 18, 2018

(86) PCT No.: PCT/KR2018/000874
§ 371 (c)(1),
(2) Date: Dec. 10, 2018

(87) PCT Pub. No.: WO2018/135890
PCT Pub. Date: Jul. 26, 2018

(65) Prior Publication Data
US 2019/0148773 A1    May 16, 2019

(30) Foreign Application Priority Data

Jan. 20, 2017 (KR) .................. 10-2017-0010040
Jan. 17, 2018 (KR) .................. 10-2018-0006123

(51) Int. Cl.
| | |
|---|---|
| H01M 10/0567 | (2010.01) |
| H01M 10/0525 | (2010.01) |
| H01M 10/0569 | (2010.01) |
| H01M 4/505 | (2010.01) |
| H01M 4/525 | (2010.01) |
| H01M 10/42 | (2006.01) |
| H01M 4/02 | (2006.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 10/0569* (2013.01); *H01M 10/4235* (2013.01); *H01M 2004/028* (2013.01); *H01M 2300/0037* (2013.01)

(58) Field of Classification Search
CPC .. H01M 10/0567; H01M 4/505; H01M 4/525; H01M 4/0525; H01M 4/0569; H01M 4/4235; H01M 10/0525; H01M 10/0569
See application file for complete search history.

(56) References Cited

U.S. PATENT DOCUMENTS

| | | | |
|---|---|---|---|
| 5,256,504 A | 10/1993 | Okuno et al. | |
| 2005/0202316 A1* | 9/2005 | Hwang ................. | H01M 4/505 429/231.1 |
| 2006/0286459 A1 | 12/2006 | Zhao et al. | |
| 2009/0253046 A1* | 10/2009 | Smart ............... | H01M 10/0568 429/326 |
| 2014/0272605 A1 | 9/2014 | Lim et al. | |
| 2016/0072150 A1 | 3/2016 | Kim et al. | |
| 2016/0359196 A1 | 12/2016 | Kim et al. | |

FOREIGN PATENT DOCUMENTS

| | | |
|---|---|---|
| CN | 103811812 A | 5/2014 |
| CN | 105098248 A | 11/2015 |
| CN | 105261791 A | 1/2016 |
| CN | 105336991 A | 2/2016 |
| CN | 105406126 A | 3/2016 |
| EP | 2367230 A1 | 9/2011 |
| JP | 3032338 B2 | 4/2000 |
| JP | 2004055502 A | 2/2004 |
| JP | 2010116475 A | 5/2010 |
| KR | 20130134237 A | 12/2013 |
| KR | 20140138078 A | 12/2014 |
| KR | 20150032416 A | 3/2015 |
| KR | 20150043683 A | 4/2015 |
| KR | 20150050082 A | 5/2015 |
| KR | 20150050149 A | 5/2015 |
| KR | 20160036810 A | 4/2016 |
| KR | 20160135513 A | 11/2016 |
| KR | 20160144123 A | 12/2016 |

OTHER PUBLICATIONS

Yeong-Min Im, "Translation of KR10-2013-0134237", Dec. 10, 2013, K-PION, Oct. 2013 (Year: 2013).*
Search report from International Application No. PCT/KR2018/000874, dated Apr. 25, 2018.
Extended European Search Report including Written Opinion for Application No. EP18741979.1 dated Jun. 18, 2019.
Chinese Search Report for Application No. 201880001563.9 dated Nov. 26, 2020, 2 pages.

* cited by examiner

*Primary Examiner* — Jimmy Vo
(74) *Attorney, Agent, or Firm* — Lerner, David, Littenberg, Krumholz & Mentlik, LLP

(57) ABSTRACT

The present invention relates to a non-aqueous electrolyte solution which includes an ionizable lithium salt, an organic solvent, and a mixed additive, wherein the organic solvent comprises at least one cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate, and fluoroethylene carbonate, and at least one linear carbonate-based organic solvent selected from the group consisting of dimethyl carbonate, diethyl carbonate, dipropyl carbonate, ethylmethyl carbonate, methylpropyl carbonate, and ethylpropyl carbonate, the mixed additive includes vinylene carbonate, 1,3-propylene sulfate, and 1,3-propane sultone in a weight ratio of 1:1:1 to 1:0.5:0.2, and a total amount of the mixed additive is in a range of 1 to 4.5 wt % based on a total weight of the non-aqueous electrolyte solution for a lithium secondary battery, and a lithium secondary battery including the same.

7 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/000874, filed Jan. 18, 2018, which claims priority to Korean Patent Application Nos. 10-2017-0010040, filed Jan. 20, 2017, and Korean Patent Application No. 10-2018-0006123, filed Jan. 17, 2018, the disclosure of which are incorporated herein by reference.

TECHNICAL FIELD

The present invention relates to a non-aqueous electrolyte solution for a lithium secondary battery and a lithium secondary battery including the same.

BACKGROUND ART

Recently, interests in energy storage technologies have been increasingly grown, and efforts for the development of high-capacity electrochemical devices have been gradually materialized as the application of the energy storage technologies is expanded to mobile phones, camcorders, notebook PCs, and even to electric vehicles.

There emerges an interest in rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery is composed of a negative electrode, such as a carbon material capable of intercalating and deintercalating lithium ions, a positive electrode formed of a lithium-containing composite oxide, and a non-aqueous electrolyte solution in which a lithium salt is dissolved in a mixed organic solvent.

In the lithium secondary battery, lithium ions react with the electrolyte solution in a voltage range of 0.5 V to 3.5 V during initial charge to form compounds, such as $Li_2CO_3$, $Li_2O$, and LiOH, and a solid electrolyte interface (SEI) film, as a kind of a passivation layer, is formed on the surface of the negative electrode by these compounds.

The SEI film formed at an initial stage of charging may prevent a reaction of the lithium ions with the carbon negative electrode or other materials during charge and discharge. Also, the SEI film may only pass the lithium ions by acting as an ion tunnel. Since the ion tunnel may prevent the destruction of a structure of the carbon negative electrode due to the co-intercalation of the carbon negative electrode and the non-aqueous organic solvents having a high molecular weight which solvate lithium ions and moves therewith, cycle life characteristics and output characteristics of the lithium secondary battery may be improved.

In a case in which the organic solvent used in the non-aqueous electrolyte solution of the lithium secondary battery is generally stored for a long period of time at high temperature, gas is generated due to the occurrence of a side reaction of the organic solvent with a transition metal oxide of a discharged positive electrode active material. Furthermore, the negative electrode is exposed while the SEI film is gradually collapsed during high-temperature storage in a fully charged state (e.g., storage at 60° C. after charged to 100% at 4.2 V), and the exposed negative electrode continuously reacts with the electrolyte solution to generate gases, such as CO, $CO_2$, $CH_4$, and $C_2H_6$.

Battery swelling and deformation of an electrode assembly occur while an internal pressure of the battery is increased by the gas thus generated, and, as a result, the battery may be deteriorated due to internal short circuit of the battery, or fire or explosion of the battery may occur.

In order to address these limitations, there is a need to develop an electrolyte solution for a lithium secondary battery which may suppress the side reaction during high-temperature storage.

PRIOR ART DOCUMENT

Japanese Patent Application Laid-open Publication No. 2010-116475

DISCLOSURE OF THE INVENTION

Technical Problem

An aspect of the present invention provides a non-aqueous electrolyte solution for a lithium secondary battery which may form a stable layer on the surface of an electrode and may suppress an electrolyte solution side reaction during high-temperature storage.

Another aspect of the present invention provides a lithium secondary battery in which high-temperature storage characteristics and cycle life characteristics are improved by including the non-aqueous electrolyte solution for a lithium secondary battery.

Technical Solution

According to an aspect of the present invention, there is provided a non-aqueous electrolyte solution for a lithium secondary battery including an ionizable lithium salt; an organic solvent; and a mixed additive, wherein the organic solvent includes at least one cycle carbonate-based organic solvent and at least one linear carbonate-based organic solvent, wherein the at least one cyclic carbonate-based organic solvent is selected from the group consisting of at least one cyclic carbonate-based organic solvent selected from the group consisting of ethylene carbonate, 1,2-butylene carbonate, 2,3-butylene carbonate, 1,2-pentylene carbonate, 2,3-pentylene carbonate, vinylene carbonate, and fluoroethylene carbonate (FEC); and wherein the at least one linear carbonate-based organic solvent selected from the group consisting of dimethyl carbonate, diethyl carbonate, dipropyl carbonate, ethylmethyl carbonate, methylpropyl carbonate, and ethylpropyl carbonate, the mixed additive includes vinylene carbonate (VC), 1,3-propylene sulfate (PPS), and 1,3-propane sultone (PS) in a weight ratio of 1:1:1 to 1:0.5:0.2, and the mixed additive is included in an amount of 1 wt % to 4.5 wt % based on a total weight of the non-aqueous electrolyte solution for a lithium secondary battery.

The organic solvent may further includes at least one linear ester-based organic solvent selected from the group consisting of methyl acetate, ethyl acetate, propyl acetate, methyl propionate, ethyl propionate, propyl propionate, and butyl propionate.

Also, as the mixed additive, the vinylene carbonate, the 1,3-propylene sulfate, and the 1,3-propane sultone may be included in a weight ratio of 1:1:1 to 1:0.7:0.25.

The mixed additive may be included in an amount of 1.5 wt % to 4.5 wt % based on the total weight of the non-aqueous electrolyte solution for a lithium secondary battery.

Furthermore, the non-aqueous electrolyte solution of the present invention may further include at least one additional additive selected from the group consisting of fluorobenzene (FB), tert-butylbenzene (TBB), tert-pentylbenzene (TPB), and LiBF$_4$.

The additional additive may be included in an amount of 0.1 wt % to 5 wt % based on the total weight of the non-aqueous electrolyte solution for a lithium secondary battery.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a secondary battery of the present invention, and the positive electrode includes a lithium-nickel-manganese-cobalt-based oxide represented by Formula 1 as a positive electrode active material:

$$Li(Ni_aCo_bMn_c)O_2 \quad \text{[Formula 1]}$$

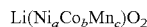

wherein, in Formula 1, $0.55 \leq a \leq 0.70$, $0.15 \leq b \leq 0.3$, $0.15 \leq c \leq 0.3$, and $a+b+c=1$.

Typical examples of the positive electrode active material may be at least one selected from $Li(Ni_{0.6}Mn_{0.2}Co_{0.2})O_2$ and $Li(Ni_{0.7}Mn_{0.15}Co_{0.15})O_2$.

Advantageous Effects

In the present invention, since a stable solid electrolyte interface (SEI) film may be formed on the surface of a negative electrode by including a mixed additive in which three types of compounds are mixed in a specific ratio, a non-aqueous electrolyte solution for a lithium secondary battery, in which a side reaction during high-temperature storage is suppressed, may be prepared. Also, a lithium secondary battery may be prepared in which high-temperature storage characteristics and cycle life characteristics are improved by including the non-aqueous electrolyte solution.

MODE FOR CARRYING OUT THE INVENTION

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is a non-aqueous electrolyte solution for a lithium secondary battery including:

an ionizable lithium salt; an organic solvent; and a mixed additive, wherein the organic solvent includes at least one cyclic carbonate-based organic solvent and at least one linear carbonate-based organic solvent, wherein the at least one cyclic carbonate-based organic solvent is selected from the group consisting of ethylene carbonate, 1,2-butylene carbonate, 2,3-butylene carbonate, 1,2-pentylene carbonate, 2,3-pentylene carbonate, vinylene carbonate, and fluoroethylene carbonate (FEC); and wherein the at least one linear carbonate-based organic solvent is selected from the group consisting of dimethyl carbonate, diethyl carbonate, dipropyl carbonate, ethylmethyl carbonate, methylpropyl carbonate, and ethylpropyl carbonate, the additive is a mixed additive which includes vinylene carbonate (VC), 1,3-propylene sulfate (PPS), and 1,3-propane sultone (PS) in a weight ratio of 1:1:1 to 1:0.5:0.2, and the mixed additive is included in an amount of 1 wt % to 4.5 wt % based on a total weight of the non-aqueous electrolyte solution for a lithium secondary battery.

First, in the non-aqueous electrolyte solution for a lithium secondary battery according to the embodiment of the present invention, any lithium salt typically used in an electrolyte solution for a lithium secondary battery may be used as the ionizable lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, and LiCH$_3$SO$_3$, or a mixture of two or more thereof, and, in addition thereto, a lithium salt, such as a lithium imide salt represented by lithium bisperfluoroethanesulfonimide (LiBETI, LiN(SO$_2$C$_2$F$_5$)$_2$), lithium fluorosulfonyl imide (LiFSI, LiN(SO$_2$F)$_2$), and lithium (bis)trifluoromethanesulfonimide (LiTFSI, LiN(SO$_2$CF$_3$)$_2$) which are typically used in the electrolyte solution of the lithium secondary battery, may be used without limitation. Specifically, the lithium salt may include a single material selected from the group consisting of LiPF$_6$, LiBF$_4$, LiCH$_3$CO$_2$, LiCF$_3$CO$_2$, LiCH$_3$SO$_3$, LiFSI, LiTFSI, and LiBETI, or a mixture of two or more thereof.

The lithium salt may be appropriately changed in a normally usable range, but may specifically be included in a concentration of 0.1 M to 3 M, for example, 0.8 M to 2.5 M in the electrolyte solution. In a case in which the concentration of the lithium salt is greater than 3 M, a film-forming effect may be reduced.

Also, in the non-aqueous electrolyte solution for a lithium secondary battery according to the embodiment of the present invention, the organic solvent does not include propylene carbonate as a cyclic carbonate-based organic solvent.

That is, the propylene carbonate (PC) is characterized in that it has low-temperature characteristics and high output characteristics due to high conductivity, but since the propylene carbonate causes an irreversible decomposition reaction with a carbon-based negative electrode material and an electrode exfoliation phenomenon caused by the propylene carbonate occurs during high-temperature cycling depending on a thickness of the electrode, capacity of the lithium secondary battery may be reduced. Particularly, in a case in which, as a non-aqueous electrolyte solution, the propylene carbonate is used with the lithium salt such as LiPF$_6$, an enormous amount of irreversible reaction may occur in a process of forming the SEI film on the surface of the carbon negative electrode and a process of intercalating the lithium ions solvated by the propylene carbonate between carbon layers. Also, when the lithium ions solvated by the propylene carbonate are intercalated between the carbon layers constituting the negative electrode, exfoliation of the carbon surface layer may proceed. The exfoliation may occur because gas, which is generated when the solvent is decomposed between the carbon layers, causes large distortion between the carbon layers. The exfoliation of the surface layer and the decomposition of the electrolyte solution may continuously proceed, and, as a result, in a case in which the non-aqueous electrolyte solution including the propylene carbonate is used with the carbon-based negative electrode material, since an effective SEI film is not formed, the lithium ions may not be intercalated into the negative electrode. This may cause problems, for example, performance of the lithium secondary battery is not only degraded, but working of the lithium secondary battery is also not smooth.

Thus, since the non-aqueous electrolyte solution for a lithium secondary battery of the present invention does not include propylene carbonate as the cyclic carbonate-based organic solvent, the non-aqueous electrolyte solution for a lithium secondary battery of the present invention may have an effect of improving high-temperature storage characteristics and cycle characteristics by preventing the performance degradation of the lithium secondary battery during high-temperature storage.

In the non-aqueous electrolyte solution for a lithium secondary battery of the present invention, a linear ester-based organic solvent may be further used, if necessary.

Specific examples of the linear ester-based organic solvent may be any one selected from the group consisting of methyl acetate, ethyl acetate, propyl acetate, methyl propionate, ethyl propionate, propyl propionate, and butyl propionate, or an organic solvent of two or more thereof, but the present invention is not limited thereto.

Also, in the non-aqueous electrolyte solution for a lithium secondary battery of the present invention, at least one of a cyclic ester-based organic solvent, an ether-based organic solvent, or an amide-based organic solvent may be mixed and used.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

Furthermore, as the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Also, in the non-aqueous electrolyte solution for a lithium secondary battery according to the embodiment of the present invention, vinylene carbonate represented by the following Formula 2, as one of the additive components, is a component which is electrochemically decomposed on the surfaces of positive electrode and negative electrode to be able to form a robust SEI film. Thus, the vinylene carbonate may improve cycle life characteristics and high-temperature storage characteristics of the secondary battery.

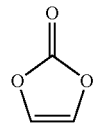

[Formula 2]

Furthermore, in the non-aqueous electrolyte solution for a lithium secondary battery according to the embodiment of the present invention, 1,3-propylene sulfate represented by the following Formula 3, as one of the additive components, is also a component for improving the cycle life characteristics of the secondary battery, wherein, in a case in which the 1,3-propylene sulfate is included, the 1,3-propylene sulfate is electrically decomposed on the surface of the negative electrode to be able to form a stable SEI film which does not crack even during high-temperature storage. The negative electrode coated with such a protective layer may prevent gas generation by suppressing the decomposition of the non-aqueous organic solvent caused by a negative electrode active material during high-temperature storage even in a case in which a highly crystallized carbon material, such as natural graphite or artificial graphite, is used in the negative electrode. Furthermore, the protective layer formed by the above compound does not interfere with a charge/discharge reaction of the battery. Thus, capacity and resistance characteristics as well as cycle life characteristics at room temperature and high temperature of the secondary battery may be improved.

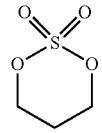

[Formula 3]

Also, in the non-aqueous electrolyte solution for a lithium secondary battery according to the embodiment of the present invention, 1,3-propane sultone represented by the following Formula 4, as one of the additive components, is a component for achieving an effect of increasing durability during high-temperature storage, wherein, since the 1,3-propane sultone is included, a stable SEI film may be formed on the surface of the negative electrode by a reduction reaction, and thus, the generation of gas caused by a reaction between the negative electrode and the electrolyte solution at high temperature may be reduced.

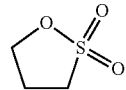

[Formula 4]

As the mixed additive, the vinylene carbonate, the 1,3-propylene sulfate, and the 1,3-propane sultone may be included in a weight ratio of 1:1:1 to 1:0.5:0.2, for example, 1:1:1 to 1:0.7:0.25.

In a case in which the amount ratio of the compounds is less than the critical range, a robust SEI film may not be formed, and, in a case in which the amount ratio of the compounds is greater than the critical range, since the excessive amount of the compound remains to cause a side reaction in the battery, gas is generated and performance is degraded.

Specifically, in a case in which weight ratios of the 1,3-propylene sulfate and the 1,3-propane sultone are respectively greater than 1 based on 1 part by weight of the vinylene carbonate, since internal resistance of the battery is increased due to the excessive use of the additive, the cycle life characteristics are reduced.

In contrast, in a case in which the weight ratio of the 1,3-propylene sulfate is less than 0.5 based on 1 part by weight of the vinylene carbonate or the weight ratio of the 1,3-propane sultone is less than 0.2 based on 1 part by weight of the vinylene carbonate, since a stabilizing effect during the formation of the SEI film is not only insignificant but the surplus vinylene carbonate causes a side reaction to increase the resistance of the battery or increase gas generation, the high-temperature storage characteristics and cycle life characteristics may be reduced.

In the non-aqueous electrolyte solution of the present invention, in a case in which the weight ratio of the compounds constituting the mixed additive satisfies the above range, since a stable SEI film may be formed without an increase in resistance, an effect of suppressing an electrolyte solution side reaction may be obtained, and thus, the cycle life characteristics and high-temperature storage characteristics of the lithium secondary battery may be improved.

The mixed additive of the present invention may be included in an amount of 1 wt % to 4.5 wt %, for example, 1.5 wt % to 4 wt % based on the total weight of the non-aqueous electrolyte solution for a lithium secondary battery.

The amount of the mixed additive in the non-aqueous electrolyte solution may be determined by reaction specific surface areas of the positive electrode and the negative electrode, wherein, if the amount of the mixed additive is 1 wt % or more, expected effects resulting from the addition of each component may be met, for example, a stable SEI film may not only be formed on the surface of the negative electrode, but the gas generation reducing effect may also be achieved by suppressing the decomposition of the electrolyte solution caused by the reaction between the electrolyte solution and the negative electrode.

If the amount of the additive is 4.5 wt % or less, the gas generation reducing effect due to the use of the additive may not only be improved, but excess remaining of each component may also be prevented so that an increase in resistance due to the side reaction may be prevented and a stable SEI film may be formed on the surface of the electrode. Thus, an effect of improving high-temperature stability of the lithium secondary battery may be obtained.

If the amount of the additive is greater than 4.5 wt %, the gas generation reducing effect may be further improved due to the excessive use of the additive, but, since an excessively thick layer may be formed as the excessive amount of each component remains, an increase in resistance and a degradation in output may occur.

Thus, since the non-aqueous electrolyte solution according to the embodiment of the present invention includes the additive in an amount of 1.5 wt % to 4.5 wt % based on the total weight of the non-aqueous electrolyte solution while including the vinylene carbonate, the 1,3-propylene sulfate, and the 1,3-propane sultone, as the additive, in a weight ratio of 1:0.5 to 1:0.2 to 1, a stable SEI film may be formed on the surface of the negative electrode, and accordingly, characteristics of the secondary battery may be improved by suppressing the decomposition of the electrolyte solution due to the reaction between the electrolyte solution and the negative electrode.

In general, a non-aqueous electrolyte solution does not include an additive as an essential component during the preparation of a secondary battery, but the non-aqueous electrolyte solution may further include the additive, if necessary, in order to further achieve improvements in cycle life characteristics, low-temperature high-rate discharge characteristics, high-temperature safety, overcharge protection, and high-temperature swelling of the secondary battery.

In the present invention, in order to improve storage characteristics at high temperature, an additive, which may suppress the decomposition reaction of the non-aqueous electrolyte solution during high-temperature storage and may form a stable layer on the surfaces of the positive electrode and negative electrode, is used.

That is, in order to improve the high-temperature storage characteristics and gas generation reducing effect, the non-aqueous electrolyte solution of the present invention may further include at least one additional additive selected from the group consisting of fluorobenzene (FB), tert-butylbenzene (TBB), tert-pentylbenzene (TPB), and $LiBF_4$, as an additional additive.

In this case, the additional additive may be included in an amount of 0.1 wt % to 5 wt % based on the total weight of the non-aqueous electrolyte solution for a lithium secondary battery. In a case in which the amount of the additional additive is less than 0.1 wt %, the effects to be achieved from the additional additive may be insignificant, and, in a case in which the amount of the additional additive is greater than 5 wt %, since the surplus additional additive causes a side reaction to increase the resistance of the battery, the cycle life of the secondary battery is reduced.

In a case in which lithium oxalyldifluoroborate (Li-ODFB), which has been conventionally used to improve low-temperature output characteristics, is used as the additional additive, since high-temperature degradation is accelerated by an adduct or residual additive, high-temperature storability may be reduced.

In the lithium secondary battery, lithium ions from a lithium metal oxide used as a positive electrode are intercalated while moving to a carbon-based electrode used as a negative electrode during initial charge, wherein, since the lithium ions are highly reactive, the lithium ions react with the carbon negative electrode and an electrolyte solution to form $Li_2CO_3$, LiO, or LiOH, and these materials form an SEI film on the surface of the negative electrode.

Once the SEI film is formed during initial charge, the SEI film may act as an ion tunnel that only passes the lithium ions between the electrolyte solution and the negative electrode while preventing a reaction of the lithium ions with the carbon negative electrode or other materials during repeated charge and discharge caused by the subsequent use of the battery. Since the SEI film blocks the movement of an organic solvent for an electrolyte solution having a high molecular weight, for example, EC, DMC, or DEC, to the carbon negative electrode by the ion tunnel effect, these organic solvents are not inserted into the carbon-based negative electrode together with lithium ions, so that collapse of the structure of the carbon-based negative electrode can be prevented. That is, once the SEI is formed, since the side reaction of the lithium ions with the carbon-based negative electrode or other materials is prevented, an amount of the lithium ions, which is required during the charge and discharge caused by the subsequent use of the battery, may be reversibly maintained. In other words, since a carbon material of the negative electrode reacts with the electrolyte solution during initial charge to form a passivation layer, it allows stable charge and discharge to be maintained without further decomposition of the electrolyte solution, and, in this case, the quantity of electric charge consumed for the formation of the layer on the surface of the negative electrode is irreversible capacity, wherein it has features that do not react reversibly during discharge, and, for this reason, the lithium ion battery no longer exhibits an irreversible reaction after the initial charge reaction and may maintain a stable life cycle.

However, when the lithium ion battery is stored at high temperature in a fully charged state (e.g., storage at 60° C. after charged to 100% at 4.2 V), the SEI film may be gradually collapsed by electrochemical energy and thermal energy which are increased over time. The collapse of the SEI film allows the surface of the negative electrode to be exposed, the exposed surface of the negative electrode is decomposed as it reacts with the carbonate-based solvent in the electrolyte solution, and thus, a continuous side reaction occurs. The side reaction may continuously generate gas, and major gases generated in this case may be CO, $CO_2$, $CH_4$, and $C_2H_6$, wherein, regardless of the type thereof, the continuous gas generation increases the internal pressure of the lithium ion battery so that it becomes a cause of swelling of a battery thickness.

In the present invention, since the vinylene carbonate, the 1,3-propylene sulfate, and the 1,3-propane sultone are mixed in the above-described ratio and used as the electrolyte solution additive, a stable SEI film is formed on the surface of the electrode to suppress the electrolyte solution side reaction during high-temperature storage, and thus, high-temperature storage safety may be improved by preventing battery swelling during high-temperature storage.

Also, in an embodiment of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a secondary battery of the present invention, and the positive electrode may include a lithium-nickel-manganese-cobalt-based oxide represented by the following Formula 1 as a positive electrode active material.

$$Li(Ni_aCo_bMn_c)O_2 \quad \text{[Formula 1]}$$

wherein, in Formula 1, $0.55 \leq a \leq 0.70$, $0.15 \leq b \leq 0.3$, $0.15 \leq c \leq 0.3$, and $a+b+c=1$.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material may include the lithium-nickel-manganese-cobalt-based oxide represented by Formula 1, and typical examples of the positive electrode active material may be $Li(Ni_{0.6}Mn_{0.2}Co_{0.2})O_2$ or $Li(Ni_{0.7}Mn_{0.15}CO_{0.15})O_2$.

It is known that the lithium-nickel-manganese-cobalt-based oxide represented by Formula 1 has high capacity per weight because a nickel content is high at 0.55 or more. Thus, it may be used as a desirable positive electrode material when a secondary battery having high energy density per weight or volume is prepared. However, since the lithium-nickel-manganese-cobalt-based oxide represented by Formula 1 has low thermal stability, it is very important to secure durability of the secondary battery at high temperature during the preparation of the secondary battery.

In the present invention, since the lithium-nickel-manganese-cobalt-based oxide represented by Formula 1 is included as the positive electrode active material and simultaneously, the electrolyte solution including the additive capable of protecting the positive electrode material is included, this problem may be solved.

In addition to the lithium transition metal oxide represented by Formula 1, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$) etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

The positive electrode active material may include $LiCoO_2$, $LiMnO_2$, $LiNiO_2$, or lithium nickel cobalt aluminum oxide (e.g., $Li(Ni_{0.8}Co_{0.15}Al_{0.05})O_2$, etc.).

The positive electrode active material may be included in an amount of 80 wt % to 99 wt %, for example, 93 wt % to 98 wt %, based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

Those sold under the names, such as acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon), may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_x$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Non-aqueous Electrolyte Solution Preparation

Example 1

(Non-aqueous Electrolyte Solution Preparation)

A non-aqueous electrolyte solution of the present invention was prepared by adding 1.0 g of vinylene carbonate, 1.0 g of 1,3-propylene sulfate, and 1.0 g of 1,3-propane sultone to 97 g of a non-aqueous organic solvent (ethylene carbonate (EC):ethyl methyl carbonate (EMC)=volume ratio of 3:7) in which 1 M $LiPF_6$ was dissolved (see Table 1 below).

(Secondary Battery Preparation)

A positive electrode active material ($Li(Ni_{0.6}Mn_{0.2}Co_{0.2}O_2)$), a conductive agent (carbon black), and a binder (polyvinylidene fluoride) were added to N-methyl-2-pyrrolidone (NMP), as a solvent, at a weight ratio of 90:5:5 to prepare a positive electrode slurry (solid content of 40 wt %). One surface of a 20 μm thick positive electrode collector (Al thin film) was coated with the positive electrode slurry, dried, and roll-pressed to prepare a positive electrode.

Subsequently, a negative electrode active material (artificial graphite), a conductive agent (carbon black), and a binder (polyvinylidene fluoride) were added to N-methyl-2-pyrrolidone (NMP), as a solvent, at a weight ratio of 90:5:5 to prepare a negative electrode slurry (solid content of 40%). One surface of a 20 μm thick negative electrode collector (Cu thin film) was coated with the negative electrode slurry, dried, and roll-pressed to prepare a negative electrode.

Next, a coin-type battery was prepared by a typical method in which the above-prepared positive electrode and negative electrode were sequentially stacked with a polyethylene porous film, and a lithium secondary battery (battery capacity 340 mAh) was then prepared by injecting the prepared non-aqueous electrolyte solution thereinto.

Example 2

A non-aqueous electrolyte solution and a lithium secondary battery including the same were prepared in the same manner as in Example 1 except that 0.5 g of vinylene carbonate, 0.5 g of 1,3-propylene sulfate, and 0.5 g of 1,3-propane sultone were added as an additive to 98.5 g of a non-aqueous organic solvent during the preparation of the non-aqueous electrolyte solution (see Table 1 below).

Example 3

A non-aqueous electrolyte solution and a lithium secondary battery including the same were prepared in the same manner as in Example 1 except that 1.5 g of vinylene carbonate, 1.5 g of 1,3-propylene sulfate, and 1.5 g of 1,3-propane sultone were included as an additive in 95.5 g of a non-aqueous organic solvent during the preparation of the non-aqueous electrolyte solution (see Table 1 below).

Example 4

A non-aqueous electrolyte solution and a lithium secondary battery including the same were prepared in the same manner as in Example 1 except that 0.8 g of vinylene carbonate, 0.6 g of 1,3-propylene sulfate, and 0.2 g of 1,3-propane sultone were included as an additive in 98.4 g of a non-aqueous organic solvent during the preparation of the non-aqueous electrolyte solution (see Table 1 below).

Example 5

A non-aqueous electrolyte solution and a lithium secondary battery including the same were prepared in the same manner as in Example 1 except that 1.6 g of vinylene carbonate, 1.2 g of 1,3-propylene sulfate, and 0.4 g of 1,3-propane sultone were included as an additive in 96.8 g of a non-aqueous organic solvent during the preparation of the non-aqueous electrolyte solution (see Table 1 below).

Example 6

A non-aqueous electrolyte solution and a lithium secondary battery including the same were prepared in the same manner as in Example 1 except that 2.0 g of vinylene carbonate, 1.5 g of 1,3-propylene sulfate, and 0.5 g of 1,3-propane sultone were included as an additive in 96 g of a non-aqueous organic solvent during the preparation of the non-aqueous electrolyte solution (see Table 1 below).

Example 7

A non-aqueous electrolyte solution and a lithium secondary battery including the same were prepared in the same manner as in Example 1 except that 1.5 g of vinylene carbonate, 1.0 g of 1,3-propylene sulfate, and 0.5 g of 1,3-propane sultone were included as an additive in 97 g of a non-aqueous organic solvent during the preparation of the non-aqueous electrolyte solution (see Table 1 below).

Comparative Example 1

A non-aqueous electrolyte solution and a lithium secondary battery including the same were prepared in the same manner as in Example 1 except that 2.0 g of lithium difluorophosphate (LiDFP) was added to 98 g of a non-aqueous organic solvent (ethylene carbonate (EC):ethyl methyl carbonate (EMC)=volume ratio of 3:7), in which 1 M LiPF$_6$ was dissolved, during the preparation of the non-aqueous electrolyte solution (see Table 1 below).

Comparative Example 2

A non-aqueous electrolyte solution and a lithium secondary battery including the same were prepared in the same manner as in Comparative Example 1 except that 2.0 g of LiBF$_4$ was added as an additive to 98 g of a non-aqueous organic solvent during the preparation of the non-aqueous electrolyte solution (see Table 1 below).

Comparative Example 3

A non-aqueous electrolyte solution and a lithium secondary battery including the same were prepared in the same manner as in Comparative Example 1 except that 3.0 g of vinylene carbonate, 0.5 g of 1,3-propylene sulfate, and 0.5 g of 1,3-propane sultone were included as an additive in 96 g of a non-aqueous organic solvent during the preparation of the non-aqueous electrolyte solution (see Table 1 below).

Comparative Example 4

A non-aqueous electrolyte solution and a lithium secondary battery including the same were prepared in the same manner as in Comparative Example 1 except that 0.5 g of vinylene carbonate, 3.0 g of 1,3-propylene sulfate, and 0.5 g of 1,3-propane sultone were included as an additive in 96 g of a non-aqueous organic solvent during the preparation of the non-aqueous electrolyte solution (see Table 1 below).

Comparative Example 5

A non-aqueous electrolyte solution and a lithium secondary battery including the same were prepared in the same manner as in Comparative Example 1 except that 0.5 g of vinylene carbonate, 0.5 g of 1,3-propylene sulfate, and 3.0 g of 1,3-propane sultone were included as an additive in 96 g of a non-aqueous organic solvent during the preparation of the non-aqueous electrolyte solution (see Table 1 below).

Comparative Example 6

A non-aqueous electrolyte solution and a lithium secondary battery including the same were prepared in the same manner as in Comparative Example 1 except that 2.0 g of 1,3-propylene sulfate and 1.0 g of 1,3-propane sultone were included as an additive in 97 g of a non-aqueous organic solvent during the preparation of the non-aqueous electrolyte solution (see Table 1 below).

Comparative Example 7

A non-aqueous electrolyte solution and a lithium secondary battery including the same were prepared in the same manner as in Comparative Example 1 except that 2.0 g of vinylene carbonate and 1.0 g of 1,3-propane sultone were included as an additive in 97 g of a non-aqueous organic solvent during the preparation of the non-aqueous electrolyte solution (see Table 1 below).

Comparative Example 8

A non-aqueous electrolyte solution and a lithium secondary battery including the same were prepared in the same manner as in Comparative Example 1 except that 1.5 g of vinylene carbonate and 1.5 g of 1,3-propylene sulfate were included as an additive in 97 g of a non-aqueous organic solvent during the preparation of the non-aqueous electrolyte solution (see Table 1 below).

Comparative Example 9

A lithium secondary battery was prepared in the same manner as in Example 7 except that a lithium cobalt composite oxide (LiCoO$_2$) was used as a positive electrode active material during the preparation of the secondary battery (see Table 1 below).

Comparative Example 10

A non-aqueous electrolyte solution and a lithium secondary battery including the same were prepared in the same manner as in Comparative Example 1 except that 2.2 g of vinylene carbonate, 0.5 g of 1,3-propylene sulfate, and 0.5 g of 1,3-propane sultone were included as an additive in 96.8 g of a non-aqueous organic solvent during the preparation of the non-aqueous electrolyte solution (see Table 1 below).

Comparative Example 11

A non-aqueous electrolyte solution and a lithium secondary battery including the same were prepared in the same manner as in Comparative Example 1 except that 2.0 g of vinylene carbonate, 1.0 g of 1,3-propylene sulfate, and 0.2 g of 1,3-propane sultone were included as an additive in 96.8 g of a non-aqueous organic solvent during the preparation of the non-aqueous electrolyte solution (see Table 1 below).

Comparative Example 12

A non-aqueous electrolyte solution and a lithium secondary battery including the same were prepared in the same manner as in Comparative Example 1 except that 1.5 g of vinylene carbonate, 1.0 g of 1,3-propylene sulfate, and 0.5 g of 1,3-propane sultone were added as an additive to 97 g of a non-aqueous organic solvent (propylene carbonate (PC):ethyl methyl carbonate (EMC)=volume ratio of 3:7), in which 1 M LiPF$_6$ was dissolved, during the preparation of the non-aqueous electrolyte solution (see Table 1 below).

Comparative Example 13

A non-aqueous electrolyte solution and a lithium secondary battery including the same were prepared in the same manner as in Comparative Example 1 except that 1.0 g of LiODFB was further included as an additive during the preparation of the non-aqueous electrolyte solution (see Table 1 below).

EXPERIMENTAL EXAMPLES

Experimental Example 1: Cycle Life Characteristic Test at Room Temperature and High Temperature Each of the secondary batteries prepared in Examples 1 to 7 and Comparative Examples 1 to 13 was charged at 1 C to 4.25 V/55 mA under a constant current/constant voltage (CC/CV) condition at 25° C. and then discharged at a constant current (CC) of 2 C to a voltage of 3.0 V (1,000 cycles/1 cycle×100) to measure 1,000 cycle life characteristics at room temperature, and the results thereof are presented in Table 1 below.

Also, each of the secondary batteries prepared in Examples 1 to 7 and Comparative Examples 1 to 13 was charged at 1 C to 4.25 V/55 mA under a constant current/constant voltage (CC/CV) condition at 45° C. and then discharged at a constant current (CC) of 2 C to a voltage of 3.0 V (1,000 cycles/1 cycle×100) to measure lifetime after 1,000 cycles at high temperature, and the results thereof are presented in Table 1 below.

Experimental Example 2: Overall Performance Measurement Experiment After High-temperature Storage After each of the secondary batteries prepared in Examples 1 to 7 and Comparative Examples 1 to 13 was stored at a high temperature of 60° C. for 16 weeks, each secondary battery was charged at 1 C to 4.25 V/55 mA under a constant current/constant voltage (CC/CV) condition at room temperature and then discharged at a constant current (CC) of 2 C to a voltage of 2.5 V, and capacity after high-temperature storage was measured by calculating discharge capacity after 16 weeks as a percentage (capacity after 16 weeks/initial discharge capacity×100(%)). The results thereof are presented in Table 1 below.

Also, after each of the secondary batteries prepared in Examples 1 to 7 and Comparative Examples 1 to 13 was stored at a high temperature of 60° C. for 16 weeks, output after 16 weeks was calculated as a percentage (output after weeks/initial output×100) using a voltage difference generated by discharging each secondary battery at 10 C for seconds at a state of charge (SOC) of 50% at room temperature, and the results thereof are presented in Table 1 below.

Furthermore, after each of the secondary batteries prepared in Examples 1 to 7 and Comparative Examples 1 to 13 was stored at a high temperature of 60° C. for 16 weeks, a change in thickness was measured, and the results thereof are presented in Table 1 below.

TABLE 1

| | | Non-aqeous electrolyte solution | | | | | |
| --- | --- | --- | --- | --- | --- | --- | --- |
| | | Organic solvent | | Additive | | | |
| | Positive electrode active material | Type (Volume ratio) | Amount added (g) | Amount of VC added (g) | Amount of PPS added (g) | Amount of PS added (g) | |
| Example 1 | Li(Ni$_{0.6}$Mn$_{0.2}$Co$_{0.2}$)O$_2$ | EC:EMC = 3:7 | 97 | 1.0 | 1.0 | 1.0 | |
| Example 2 | Li(Ni$_{0.6}$Mn$_{0.2}$Co$_{0.2}$)O$_2$ | EC:EMC = 3:7 | 98.5 | 0.5 | 0.5 | 0.5 | |
| Example 3 | Li(Ni$_{0.6}$Mn$_{0.2}$Co$_{0.2}$)O$_2$ | EC:EMC = 3:7 | 95.5 | 1.5 | 1.5 | 1.5 | |
| Example 4 | Li(Ni$_{0.6}$Mn$_{0.2}$Co$_{0.2}$)O$_2$ | EC:EMC = 3:7 | 98.4 | 0.8 | 0.6 | 0.2 | |
| Example 5 | Li(Ni$_{0.6}$Mn$_{0.2}$Co$_{0.2}$)O$_2$ | EC:EMC = 3:7 | 96.8 | 1.6 | 1.2 | 0.4 | |
| Example 6 | Li(Ni$_{0.6}$Mn$_{0.2}$Co$_{0.2}$)O$_2$ | EC:EMC = 3:7 | 96 | 2.0 | 1.5 | 0.5 | |
| Example 7 | Li(Ni$_{0.6}$Mn$_{0.2}$Co$_{0.2}$)O$_2$ | EC:EMC = 3:7 | 97 | 1.5 | 1.0 | 0.5 | |
| Comparative Example 1 | Li(Ni$_{0.6}$Mn$_{0.2}$Co$_{0.2}$)O$_2$ | EC:EMC = 3:7 | 98 | — | — | — | |
| Comparative Example 2 | Li(Ni$_{0.6}$Mn$_{0.2}$Co$_{0.2}$)O$_2$ | EC:EMC = 3:7 | 98 | — | — | — | |
| Comparative Example 3 | Li(Ni$_{0.6}$Mn$_{0.2}$Co$_{0.2}$)O$_2$ | EC:EMC = 3:7 | 96 | 3.0 | 0.5 | 0.5 | |
| Comparative Example 4 | Li(Ni$_{0.6}$Mn$_{0.2}$Co$_{0.2}$)O$_2$ | EC:EMC = 3:7 | 96 | 0.5 | 3.0 | 0.5 | |
| Comparative Example 5 | Li(Ni$_{0.6}$Mn$_{0.2}$Co$_{0.2}$)O$_2$ | EC:EMC = 3:7 | 96 | 0.5 | 0.5 | 3.0 | |
| Comparative Example 6 | Li(Ni$_{0.6}$Mn$_{0.2}$Co$_{0.2}$)O$_2$ | EC:EMC = 3:7 | 97 | — | 2.0 | 1.0 | |
| Comparative Example 7 | Li(Ni$_{0.6}$Mn$_{0.2}$Co$_{0.2}$)O$_2$ | EC:EMC = 3:7 | 97 | 2.0 | — | 1.0 | |
| Comparative Example 8 | Li(Ni$_{0.6}$Mn$_{0.2}$Co$_{0.2}$)O$_2$ | EC:EMC = 3:7 | 97 | 1.5 | 1.5 | — | |
| Comparative Example 9 | LiCoO$_2$ | EC:EMC = 3:7 | 97 | 1.5 | 1.0 | 0.5 | |
| Comparative Example 10 | Li(Ni$_{0.6}$Mn$_{0.2}$Co$_{0.2}$)O$_2$ | EC:EMC = 3:7 | 96.8 | 2.2 | 0.5 | 0.5 | |
| Comparative Example 11 | Li(Ni$_{0.6}$Mn$_{0.2}$Co$_{0.2}$)O$_2$ | EC:EMC = 3:7 | 96.8 | 2.0 | 1.0 | 0.2 | |
| Comparative Example 12 | Li(Ni$_{0.6}$Mn$_{0.2}$Co$_{0.2}$)O$_2$ | PC:EMC = 3:7 | 97 | 1.5 | 1.0 | 0.5 | |
| Comparative Example 13 | Li(Ni$_{0.6}$Mn$_{0.2}$Co$_{0.2}$)O$_2$ | EC:EMC = 3:7 | 96 | 1.5 | 0.6 | 0.5 | |

TABLE 1-continued

| | Non-aqeous electrolyte solution Additive | | High-temperature storage characteristics (%) | | | Cycle life characteristics (%) | |
|---|---|---|---|---|---|---|---|
| | Others | Total Amount (g) | Capacity | Output | Battery thickness | Room temperature lifetime | High temperature lifetime |
| Example 1 | — | 3.0 | 76.5 | 78.5 | 19.3 | 84.2 | 74.6 |
| Example 2 | — | 1.5 | 75.9 | 77.6 | 24.8 | 81.6 | 72.9 |
| Example 3 | — | 4.5 | 74.2 | 74.1 | 22.7 | 86.2 | 72.1 |
| Example 4 | — | 1.6 | 73.8 | 74.9 | 32.2 | 83.4 | 73.2 |
| Example 5 | — | 3.2 | 72.5 | 74.2 | 26.6 | 84.9 | 72.0 |
| Example 6 | — | 4.0 | 71.2 | 73.8 | 32.0 | 85.2 | 72.3 |
| Example 7 | — | 3.0 | 72.9 | 73.4 | 24.7 | 85.1 | 72.8 |
| Comparative Example 1 | LiDFP 2.0 g | 2.0 | 70.2 | 72.8 | 27.8 | 67.6 | 52.7 |
| Comparative Example 2 | LiBF$_4$ 2.0 g | 2.0 | 69.1 | 70.4 | 29.3 | 61.5 | 52.5 |
| Comparative Example 3 | — | 4.0 | 59.3 | 61.7 | Vent | 76.3 | 57.7 |
| Comparative Example 4 | — | 4.0 | 62.7 | 64.4 | 34.2 | 78.7 | 65.6 |
| Comparative Example 5 | — | 4.0 | 70.4 | 70.8 | 18.6 | 73.4 | 68.9 |
| Comparative Example 6 | — | 3.0 | 67.5 | 68.6 | 20.4 | 72.8 | 67.2 |
| Comparative Example 7 | — | 3.0 | 69.1 | 70.9 | 38.8 | 77.6 | 63.1 |
| Comparative Example 8 | — | 3.0 | 61.2 | 65.9 | Vent | 77.2 | 58.4 |
| Comparative Example 9 | — | 3.0 | 67.5 | 68.4 | 29.2 | 74.7 | 70.6 |
| Comparative Example 10 | — | 3.2 | 62.6 | 64.7 | 57.4 | — | — |
| Comparative Example 11 | — | 3.2 | 61.4 | 63.1 | Vent | — | — |
| Comparative Example 12 | — | 3.0 | | | No cell working | | |
| Comparative Example 13 | LiODFB 1.0 g | 4.0 | 61.6 | 62.1 | 59.1 | — | — |

As illustrated in Table 1, when the life characteristics after 1,000 cycles were examined, it may be confirmed that the secondary batteries prepared in Examples 1 to 7 had significantly better room-temperature and high-temperature cycle life characteristics than the secondary batteries prepared in Comparative Examples 1 to 9.

Also, when the high-temperature storage characteristics were examined, it may be confirmed that capacity and output characteristics of the secondary batteries prepared in Examples 1 to 7 were improved in comparison to those of the secondary batteries prepared in Comparative Examples 1 to 11 and 13. Furthermore, when the battery thickness increase rate was examined, it may be confirmed that battery thickness increase rates of the secondary batteries prepared in Examples 1 to 7 were mostly lower than those of the secondary batteries prepared in Comparative Examples 1 to 11 and 13.

Particularly, with respect to the secondary battery of Comparative Example 9 which included LCO as a positive electrode active material, since stability of the SEI formed on the surface of the positive electrode was relatively lower than those of the secondary batteries of Examples 1 to 7 including the lithium-nickel-manganese-cobalt-based oxide, it may be understood that the cycle life characteristics and high-temperature storage characteristics were degraded.

Also, with respect to the secondary battery of Comparative Example 13 which further included LiODFB as a non-aqueous electrolyte solution additive, it may be understood that the high-temperature storage characteristics were degraded in comparison to the secondary batteries of Examples 1 to 7 due to residual LiODFB and a layer formed by the corresponding additive.

Particularly, with respect to the secondary battery of Comparative Example 12 which included the propylene carbonate, instead of the ethylene carbonate, as the non-aqueous organic solvent, since the repeated deintercalation of lithium ions was not possible due to exfoliation caused by the penetration of the PC into the negative electrode, it was confirmed that the working of the cell was not possible in the secondary battery using the PC solvent and the carbon-based (graphite) negative electrode.

The invention claimed is:

1. A non-aqueous electrolyte solution for a lithium secondary battery, the non-aqueous electrolyte solution consisting of:
   an ionizable lithium salt;
   an organic solvent;
   a mixed additive that is vinylene carbonate, 1,3-propylene sulfate, and 1,3-propane sultone; and
   optionally an additional additive,
   wherein the ionizable lithium salt is selected from the group consisting of LiCl, LiBr, LiI, LiClO$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, and LiCH$_3$SO$_3$, LiN(SO$_2$C$_2$F$_5$)$_2$, LiN(SO$_2$CF$_3$)$_2$, or mixtures thereof, wherein the organic solvent comprises at least one cyclic carbonate-based organic solvent and at least one linear carbonate-based organic solvent, wherein the at least one cyclic carbonate-based organic solvent is selected from the group consisting of ethylene carbonate, 1,2-butylene carbonate, 2,3-butylene carbonate, 1,2-pentylene carbonate, 2,3-pentylene carbonate, and fluoroethylene carbonate (FEC), wherein the at least one linear carbonate-based organic solvent selected from the group consisting of dimethyl carbonate, diethyl carbonate, dipropyl carbonate, ethylmethyl carbonate, methylpropyl carbonate, and ethylpropyl carbonate, wherein the additional additive is at least one selected from the group consisting of fluorobenzene (FB), tert-butylbenzene (TBB), tert-pentylbenzene (TPB), and $LiBF_4$, wherein the vinylene carbonate, the 1,3-propylene sulfate, and 1,3-propane sultone are present in the mixed additive in a weight ratio of 1:1:1 to 1:0.5:0.2, and wherein the mixed additive is included in an amount of 1 wt % to 4.5 wt % based on a total weight of the non-aqueous electrolyte solution for a lithium secondary battery.

2. The non-aqueous electrolyte solution for a lithium secondary battery of claim 1, wherein the vinylene carbonate, the 1,3-propylene sulfate, and the 1,3-propane sultone are present in the mixed additive in a weight ratio of 1:1:1 to 1:0.7:0.25.

3. The non-aqueous electrolyte solution for a lithium secondary battery of claim 1, wherein the mixed additive is included in an amount of 1.5 wt % to 4.5 wt % based on the total weight of the non-aqueous electrolyte solution for a lithium secondary battery.

4. The non-aqueous electrolyte solution for a lithium secondary battery of claim 1, wherein the organic solvent further comprises at least one linear ester-based organic solvent selected from the group consisting of methyl acetate, ethyl acetate, propyl acetate, methyl propionate, ethyl propionate, propyl propionate, and butyl propionate.

5. The non-aqueous electrolyte solution for a lithium secondary battery of claim 1, wherein the additional additive is included in an amount of 0.1 wt % to 5 wt % based on the total weight of the non-aqueous electrolyte solution for a lithium secondary battery.

6. A lithium secondary battery comprising a negative electrode, a positive electrode, a separator disposed between the negative electrode and the positive electrode, and a non-aqueous electrolyte solution, wherein the non-aqueous electrolyte solution comprises the non-aqueous electrolyte solution for a lithium secondary battery of claim 1, and the positive electrode comprises a lithium-nickel-manganese-cobalt-based oxide represented by Formula 1 as a positive electrode active material:

$Li(Ni_aCo_bMn_c)O_2$ [Formula 1]

wherein, in Formula 1, $0.55 \leq a \leq 0.70$, $0.15 \leq b \leq 0.3$, $0.15 \leq c \leq 0.3$, and $a+b+c=1$.

7. The lithium secondary battery of claim 6, wherein the positive electrode active material comprises at least one selected from $Li(Ni_{0.6}Mn_{0.2}Co_{0.2})O_2$ and $Li(Ni_{0.7}Mn_{0.15}Co_{0.15})O_2$.

* * * * *